US012654938B2

(12) United States Patent
    Austrheim et al.

(10) Patent No.: US 12,654,938 B2
(45) Date of Patent: Jun. 16, 2026

(54) CONTAINER HANDLING VEHICLE ELEVATOR

(71) Applicant: Autostore Technology AS, Nedre Vats (NO)

(72) Inventors: Trond Austrheim, Etne (NO); Jørgen Djuve Heggebø, Olen (NO)

(73) Assignee: AutoStore Technology AS, Nedre Vats (NO)

( * ) Notice: Subject to any disclaimer, the term of this patent is extended or adjusted under 35 U.S.C. 154(b) by 779 days.

(21) Appl. No.: 18/001,128

(22) PCT Filed: Jun. 18, 2021

(86) PCT No.: PCT/EP2021/066579
    § 371 (c)(1),
    (2) Date: Dec. 8, 2022

(87) PCT Pub. No.: WO2021/255235
    PCT Pub. Date: Dec. 23, 2021

(65) Prior Publication Data
    US 2023/0211948 A1      Jul. 6, 2023

(30) Foreign Application Priority Data

Jun. 19, 2020    (NO) .................................... 20200722

(51) Int. Cl.
    B65G 1/06        (2006.01)
    B65G 1/04        (2006.01)
    B66B 9/16        (2006.01)
(52) U.S. Cl.
    CPC ......... B65G 1/0464 (2013.01); B65G 1/0414 (2013.01); B65G 1/0478 (2013.01);
    (Continued)
(58) Field of Classification Search
    None
    See application file for complete search history.

(56) References Cited

U.S. PATENT DOCUMENTS 4,007,843 A *  2/1977  Lubbers ............... B65G 1/0414
                                              414/273
8,851,818 B2 * 10/2014  Ogawa ................... B65G 1/065
                                              414/284
(Continued)

FOREIGN PATENT DOCUMENTS

CA         986036 A      3/1976
CN      103061555 A      4/2013
            (Continued)

OTHER PUBLICATIONS

Gong Lei, First Office Action for Chinese Patent Application No. 202180043423X, dated Jan. 27, 2025, 15 pages, pub. by SIPO, Beijing, China.

(Continued)

*Primary Examiner* — Mark C Hageman
(74) *Attorney, Agent, or Firm* — Baker Botts L.L.P.

(57) ABSTRACT

An automated storage and retrieval system includes a framework structure having a plurality of internal and peripheral upright members arranged to define a storage grid including multiple storage columns for storing storage containers on top of each other in vertical stacks. The upright members are interconnected at their upper ends by a rail system arranged to guide at least one container handling vehicle thereon. The container handling vehicle is configured to raise storage containers from, and lower storage containers into the storage columns and to transport the storage containers horizontally above the storage columns. The peripheral upright members of the framework structure define a horizontal periphery of the framework structure. A vehicle elevator includes a vertically extending support, a platform, and a lift mechanism. The platform includes a horizontally extending structure arranged to carry the container handling vehicle and a connection device moveably attaching the platform to the vertically extending support. The lift mechanism is (Continued)

arranged to move the platform between a first lift stop position, which establishes access between the platform and the rail system, and a second lift stop position arranged within an accessing area such that a human operator/service personnel and/or robot can perform in-situ maintenance on the container handling vehicle while the container handling vehicle is arranged on the platform. The first and second lift stop positions are arranged vertically offset.

15 Claims, 11 Drawing Sheets

(52) U.S. Cl.
  CPC ........... B65G 1/0485 (2013.01); B65G 1/065 (2013.01); B66B 9/16 (2013.01); *B65G 2201/0235* (2013.01)

(56) References Cited

U.S. PATENT DOCUMENTS

| | | |
|---|---|---|
| 2017/0226765 A1 | 8/2017 | Wastel |
| 2020/0002091 A1 | 1/2020 | Shields et al. |

FOREIGN PATENT DOCUMENTS

| | | |
|---|---|---|
| CN | 208666179 U | 3/2019 |
| DE | 1931792 A1 | 9/1970 |
| DE | 102009051800 A1 | 5/2011 |
| JP | H0610269 U | 2/1994 |
| JP | 2013018611 A | 1/2013 |
| NO | 317366 B1 | 10/2004 |
| WO | 2014/075937 A1 | 5/2014 |
| WO | 2014/090684 A1 | 6/2014 |
| WO | 2014/160403 A2 | 10/2014 |
| WO | 2015/193278 A1 | 12/2015 |
| WO | 2018/146304 A1 | 8/2018 |
| WO | 2018141876 A1 | 8/2018 |
| WO | 2019/122651 A1 | 6/2019 |
| WO | 2019/233632 A1 | 12/2019 |
| WO | 2019/238639 A1 | 12/2019 |
| WO | 2019238641 A1 | 12/2019 |
| WO | 2020/126725 A1 | 6/2020 |
| WO | 2020/127060 A1 | 6/2020 |

OTHER PUBLICATIONS

Martin, Benoit, Extended European Search Report in EP24219396.9, mailed May 22, 2025, 11 pages, European Patent Office, Munich, Germany.

International Search Report issued in Application No. PCT/EP2021/066579 mailed on Sep. 7, 2021 (5 pages).

Written Opinion issued in Application No. PCT/EP2021/066579 mailed on Sep. 7, 2021 (12 pages).

Norwegian Search Report issued in Norwegian Application No. 20200722 mailed on Jan. 14, 2021 (2 pages).

Benoit Martin, Examination Report for European Patent Application No. 21734801.0, mailed Apr. 18, 2024, 5 pages, European Patent Office, Rijswijk, Netherlands.

Gong, Lei, Office Action in CN202180043423.X, mailed Jul. 30, 2025, 14 pages, The State Intellectual Property Office of the People's Republic of China, Beijing, China.

Kato, Mitsuyoshi, Office Action in JP2022577299, mailed Jul. 11, 2025, 15 pages, Japan Patent Office, Tokyo, Japan.

Anonymous, Office Action in KR1020237001715, mailed Jan. 12, 2026, 19 pages, Korean Intellectual Property Office, Daejeon, Korea.

Gong, Lei, Office Action in CN202180043423.X, mailed Dec. 23, 2025, 18 pages, The State Intellectual Property Office of the People's Republic of China, Beijing, China.

\* cited by examiner

201a

201

Y

X

Z

201c

201b

301

301a

304

Y

X

Z

301c

301b

600

101

630

640

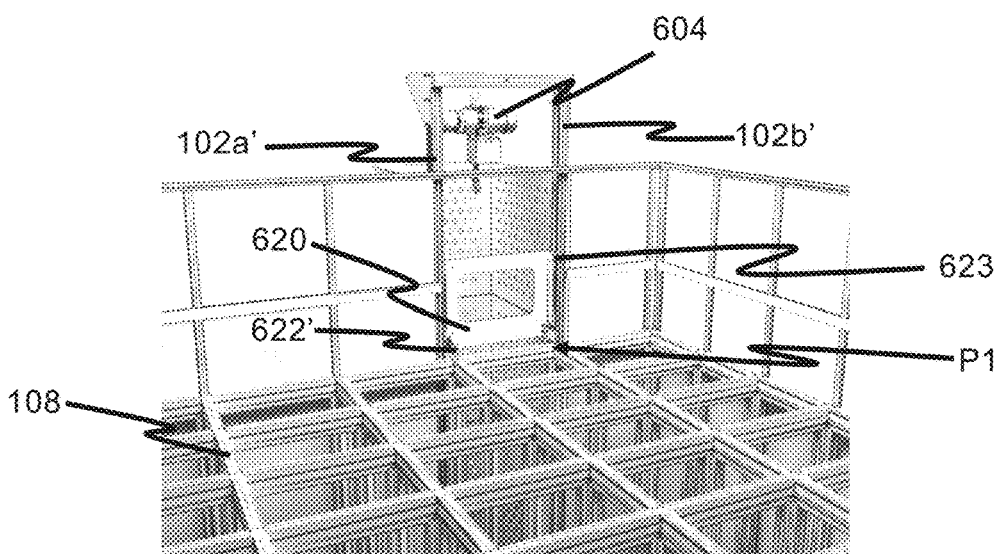
Fig. 9A
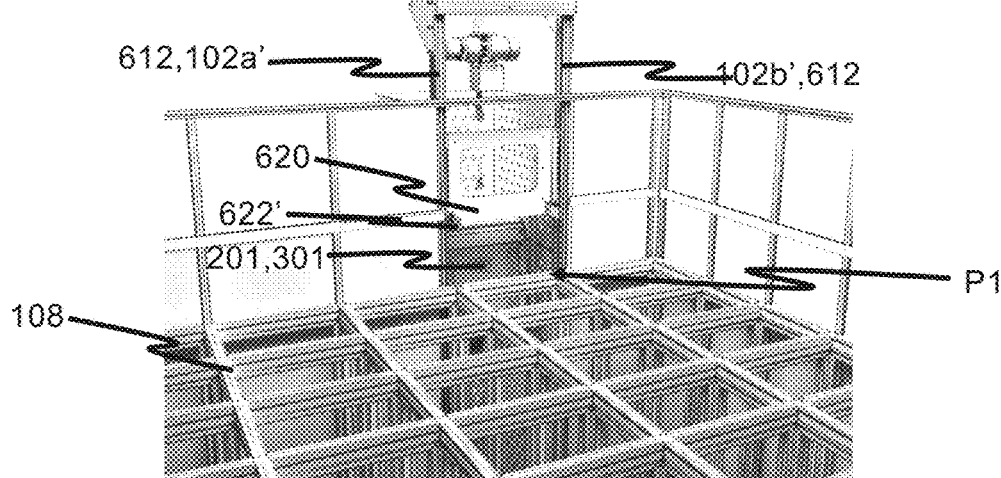
Fig. 9B
Fig. 9C

CONTAINER HANDLING VEHICLE ELEVATOR

FIELD OF THE INVENTION

The present invention relates to an automated storage and retrieval system for storage and retrieval of containers, in particular to vehicle elevator for transporting a container handling vehicle to an accessing area for performing maintenance on the container handling vehicle.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the framework structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3, two wheels in each set are fully visible. The first set of wheels 201b,301b is arranged to engage with two adjacent rails of the first set of rails 110, and the second set of wheels 201c,301c is arranged to engage with two adjacent rails of the second set of rails 111. At least one of the first and second sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal to the first direction X and the second direction Y. Part of the gripping device of the container handling vehicle 301 are shown in FIG. 3 indicated with reference number 304. The gripping device of the container handling device 201 is located within the vehicle body 201a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 201,301 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107.

However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. another framework structure or another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles.

Alternatively, or in addition, the automated storage and retrieval system 1 may have container handling vehicles 201,301 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301 positions the storage container 106 at the desired position. The removed storage containers 106 may then be lowered back into the storage column 105, or relocated to other storage columns 105.

For monitoring and controlling the automated storage and retrieval system 1, the automated storage and retrieval system 1 comprises a control system 500 which typically is computerized and which typically comprises a database for keeping track of the storage containers 106. Monitoring and controlling the automated storage and retrieval system 1 may include monitoring and controlling the location of respective storage containers 106 within the framework structure 100, the content of each storage container 106, and the movement of the container handling vehicles 201,301, so that a desired storage container 106 can be delivered to the desired location at the desired time without the container handling vehicles 201,301 colliding with each other.

NO993282L describes automated storage and retrieval system having two storage units that are interconnected by a rail system on which the robots move between the two units. The system describes a sensor or probe to indicate the exact position for defined crossing for the robots between the two units this is detected by the absence of the metal in the side walls of the guide groove at the point where two traverse rails cross.

A problem with known automated storage and retrieval systems is inter alia the difficulty to conduct service on malfunctioning container handling vehicles that is space efficient/saving and that does not put the entire system to a halt.

It is known to perform in-situ service by an operator at the position of the malfunctioning container handling vehicle when arranged on the rail system above the storage columns by e.g. using a service vehicle, which can be manually driven by service personnel, to reach the destination of the malfunctioning vehicle. In other embodiments the service vehicle can pick up the malfunctioning vehicle and transport it to a service area being level with the rail system of the framework structure of the automated storage and retrieval system.

However, such performances require that the service vehicle is available to drive onto the rail system of the malfunctioning container handling vehicle from an area being arranged level with the rail systems of the malfunctioning container handling vehicle and preferably arranged on rails being in alignment with the rail system of the framework structure, requiring a large area for storage of the service vehicle and equipment for servicing the vehicle at the level of the rail system of the framework structure.

Further, the mentioned activities may cause unnecessary delay of the total performance of the system as operating container handling vehicles may have to be put to a halt for the operator to perform in-situ services to the malfunctioning container handling vehicle and/or for the service vehicle to safely travel on the rail system.

In view of the above, it is desirable to provide an automated storage and retrieval system and a method thereof, that solve or at least mitigate one or more of the aforementioned problems related to use of prior art storage and retrieval systems.

Hence, an object of the present invention to provide a storage and retrieval system that is space efficient. The storage and retrieval system does e.g. not require a large area and/or mezzanine for a service vehicle and/or equipment for servicing a malfunctioning container handling vehicle to be arranged at the level of the rail system of the framework structure of the storage and retrieval system.

It is further an object of the present invention to provide a storage and retrieval system wherein container handling vehicles can easily be added to or removed from rail system of the system.

It is also an object of the present invention to provide a safe system for accessing a malfunctioning container handling vehicle providing inter alia a safe working environment for service personnel.

SUMMARY OF THE INVENTION

The present invention is set forth and characterized in the independent claims, while the dependent claims describe other characteristics of the invention.

In one aspect the invention relates to an automated storage and retrieval system comprising a framework structure having a plurality of internal and peripheral upright members arranged to define a storage grid comprising multiple storage columns for storing storage containers on top of each other in vertical stacks. The upright members are interconnected at their upper ends by a rail system arranged to guide at least one container handling vehicle thereon. The container handling vehicle(s) is/are configured to raise storage containers from, and lower storage containers into the storage columns and to transport the storage containers horizontally above the storage columns. The peripheral upright members of the framework structure define a horizontal periphery of the framework structure.

The rail system may comprise a first set of parallel rails arranged in a horizontal plane and extending in a first direction X, and a second set of parallel rails arranged in the horizontal plane and extending in a second direction Y which is orthogonal to the first direction X. The first and second sets of rails form a grid pattern in the horizontal plane comprising a plurality of adjacent grid cells, each grid cell comprising a grid opening defined by a pair of adjacent rails of the first set of rails and a pair of adjacent rails of the second set of rails. Each storage column is located vertically below a grid opening. As mentioned above, the container handling vehicle(s) is/are configured to move laterally on the rail system above the storage columns to access the storage containers via the grid openings.

Further, the automated storage and retrieval system comprises a vehicle elevator for transporting a container handling vehicle. The vehicle elevator comprises a vertically extending support, a platform and a lift mechanism. The platform comprises a horizontally extending structure (i.e. parallel to the plane set up by the rail system) arranged to carry/support container handling vehicle(s) and a connection device which is moveably attaching the platform to the vertically extending support. The vehicle elevator also comprises a lift mechanism arranged to move the platform between a first lift stop position, which establishes access between the platform and the rail system, and a second lift stop position which is arranged within an accessing area such that a human operator/service personnel and/or robot can perform in-situ maintenance on the container handling vehicle while the container handling vehicle is arranged on the platform. The first and second lift stop positions are arranged vertically offset, for example between the floor level of the framework structure and the rail system.

In the event that an operable container handling vehicle working on top of the above-mentioned rail system stops functioning normally, and hence needs maintenance or service, the malfunctioning container handling vehicle can move or be moved from its position on the rail system onto the platform of the vehicle elevator when the platform is arranged at the first lift stop position. The malfunctioning container handling vehicle can then be transported to the second lift stop position of an accessing area wherein a human operator and/or robot may conduct maintenance or service on the container handling vehicle in-situ at the second lift stop position. After maintenance has been conducted, the container handling vehicle can be sent back to the first lift stop position such that the vehicle can move back on to the rail system of the storage grid.

If the damage of the container handling vehicle is severe, i.e. service cannot be conducted in-situ at the second lift stop position, the container handling vehicle may be removed from the second lift stop position by the aid of a human operator and/or robot and on to for example a trolley or similar for moving the container handling vehicle to a service area. Another functioning container handling vehicle may then be moved on to the second lift stop position by the aid of a human operator and/or robot and then moved to the first lift stop position by the vehicle elevator such that the functioning container handling vehicle can move on to the rail system of the framework structure.

The vertically extending support of the vehicle elevator may comprise at least two guiding rails for guiding the platform of the vehicle elevator. The connection device of the platform may comprise linear bearings or rollers which are moveably attached to the guiding rails allowing the platform to move in a vertical direction Z, i.e. perpendicular to the X-Y plane set up by the rail system.

The horizontally extending structure of the platform may comprise an underlying support structure fixed to the horizontally extending structure. The underlying support structure may comprise a vertically extending structure fixed to the connection device being moveably attached to the guiding rails (for examples via wheels), providing support when the container handling vehicle is arranged on the platform.

The horizontal structure of the platform of the vehicle elevator may comprises a platform rail arrangement. The platform rail arrangement may have at least one set of parallel rails configured to allow the container handling vehicle to move between the platform rail arrangement and the rail system when the platform rail arrangement is vertically levelled with the rail system and the platform is in the first lift stop position. Hence, the platform rail arrangement is in this position vertically aligned with the rails of the rail system of the framework structure.

The lift mechanism may be a simple traditional manual hoist/pulley system or an electric hoist/pulley system. The lift mechanism may for example comprise a winch and a cable for lifting the platform. The lift mechanism may be arranged at the upper end of the vertically extending support of the vehicle elevator having a cable or wire connected to the platform. Both the hoist/pulley system and the winch may be automatized using transmitters in signal communication with a control system such as the control system operating the container handling vehicle(s).

The system of the present invention may further comprise a moveable barrier configured to prohibit the container handling vehicle from entering into the first lift stop position when the platform is positioned away from the first lift stop position, and to allow the container handling vehicle to enter the platform when the platform is arranged at the first lift stop position. The moveable barrier may e.g. be in the form of a beam barrier, slideable gate or it may be a blocking structure movable in the vertical direction.

In a further example embodiment, the vehicle elevator may comprise a lift frame arranged to reach around/frame/enclose opposed sides of a container handling vehicle when the container handling vehicle is being carried on the platform. The lift frame may be connected to for example the cable or wire of the lift mechanism in order to lift the platform.

The lift frame may be used to suspend the platform to the lift mechanism by e.g. a cable of a winch in order to lift the platform. The cable or wire of the lift mechanism may lift the platform from a suspension point of the lift frame arranged at or near the center of gravity of the platform when a container handling vehicle is arranged on the platform. Further, since the lift frame may extend around the container handling vehicle it may provide security in terms of keeping the container handling vehicle securely on the platform when moving the platform between the first and second lift stop positions.

In an example embodiment the lift frame may form a passage for the container handling vehicle. The lift frame may comprise two vertically arranged poles extending from opposite sides of the outer periphery of the platform. The two poles may be interconnected at their distal ends from the platform by a horizontally arranged beam having the suspension point.

In another example embodiment the platform may be arranged within a shaft when moved between the first and second lift stop positions. The shaft may be configured to prevent the container handling vehicle from falling off the platform.

The shaft may be a cover which encloses the platform when travelling between the first and second lift stop positions. Further, the shaft may enclose the upper lift stop position preventing the container handling vehicle from falling off the platform when moving the container handling vehicle on to or off the platform at the upper lift stop position.

The inventive system may further comprise a shield, such as a door, which is arranged to block access to the second lift stop position when the shield is closed. Further, the shield may only be openable once the platform has reached the second lift position.

The shield may further be configured such that it can only be opened when the moveable barrier is in closed position, thereby prohibiting container handling vehicles to enter into the upper lift stop position.

Further, the vehicle elevator may only be operable while the shield is closed preventing personnel to enter into the lower lift stop position while the platform is moving between the upper and lower lift stop positions and while the platform is arranged at the first lift stop position.

The inventive system may further comprise a locking mechanism provided on the framework structure and arranged to lock or hold the platform at a set height in vertical alignment with the rail system when arranged at the first lift stop position.

The locking mechanism may be any arrangement providing a displaceable catch/fastener to the platform when arranged at the first lift stop position which can be releasably opened when the vehicle elevator is operable. The displaceable catch may be an actuated bolt, latch or lug, or it comprise a bracket positioned on the platform which is arranged to lock and unlock to a biased pawl arranged on the horizontal periphery of the framework structure. The pawl may e.g. be spring biased or gravity biased.

During operation of the automated storage and retrieval system errors may occur requiring a human operator to access the rail system. This may be needed if e.g. a malfunctioning container handling vehicle cannot move to the vehicle elevator.

Hence, in an example embodiment of the invention the system may further comprise a staircase/ladder or similar allowing the human operator to access the rail system.

The staircase may span from the level of the accessing area/floor level to the level of the rail system, wherein the two levels are arranged vertically offset.

The staircase may beneficially be arranged near the vehicle elevator, such as adjacent the vehicle elevator thereby enabling the human operator to feed the elevator with a malfunctioning container handling vehicle at the level of the rail system.

It is beneficial for the vehicle elevator and the staircase to occupy as little space as possible of the automated storage and retrieval system as the system should be as compact as possible.

For reducing the risk of damage to the personnel the staircase should only be accessible by the human operator when the system has been shut down. Hence, a shield, such as a door or gate, may be arranged close to the staircase prohibiting access to the staircase by the human operator during operation of the system and enabling access when the system is shut down.

The rail system and/or the staircase at the level of the rail system may comprise a barrier preventing operating container handling vehicles from entering the staircase.

Additionally or alternatively, the staircase may be built more narrow than any width of the container handling vehicle such that the container handling vehicles are protected from entering the staircase.

Additionally or alternatively, the staircase may be arranged such that the position of the rails of the rail system prohibits the container handling vehicles from entering the staircase.

In an example embodiment the vehicle elevator and the staircase can both be integrated in the framework structure. For example, the vehicle elevator and staircase may occupy an area of 3×3 storage columns.

According to another example embodiment of the invention the accessing area for accessing the container handling vehicle on the vehicle lift may be arranged at or within a floor/story above the storage grid. In this embodiment the first lift stop position is arranged vertically below the second lift stop position, and the vehicle elevator passes through a floor opening of the floor above the storage grid. The accessing area may hence be arranged at a level being similar to the level of the human operator accessing the accessing station as disclosed in FIG. 6A of WO 2019/238661 A1, incorporated herein by reference.

In another example embodiment the accessing area may arranged at a floor/story below the storage grid similar to the arrangement of the delivery station shown in FIG. 2 of WO 2014/075937 A1, incorporated herein by reference. In this example embodiment the framework structure may be arranged directly above the accessing area which can be arranged at the level of the shown delivery station being below the storage grid. In this embodiment the vehicle elevator can be arranged within a pit of the framework or projecting from the periphery of the framework structure.

In yet another example embodiment, the accessing area may be arranged within a region of the storage grid environment such that the accessing area is arranged at a region within the storage grid environment. e.g. like a central courtyard of a quad.

In yet a further example embodiment, the vehicle elevator may project from the outer periphery of the storage grid of the framework structure. Hence, the horizontally extending structure of the platform may project or have a horizontal extension outside the outer periphery of the storage grid such that the accessing area is arranged outside the outer periphery of the storage grid of the framework structure.

For the embodiments where the second lift stop position is arranged vertically below the first lift stop position, the vertically extending support may comprise at least two of the plurality of peripheral upright members of the framework structure serving as guiding rails for guiding the platform of the vehicle elevator in the vertical direction Z between the first and second lift stop positions.

In such embodiment the moveable barrier may be attached to the same peripheral upright members of the framework structure serving as guiding rails for the moveable barrier moving the barrier in the vertical direction Z.

Further, the moveably barrier may comprise a connection device having the same or similar configuration as the connection device of the platform of the vehicle elevator.

Further, the lift frame may be configured to engage and lift the moveable barrier such that the moveable barrier allows the container handling vehicle to enter the platform when the platform is arranged at the first lift stop position.

The beam of the lift frame may for example be configured to push the moveable barrier away from the upper lift stop position when the platform enters the upper lift stop position. The moveable barrier may comprise a horizontal bar, extending from the base of the moveable barrier. The bar may be leaning onto the beam of the lift frame when the beam is arranged at or above the first lift stop position, independently of whether the platform is carrying a container handling vehicle or not. Hence the beam of the lift frame engages with the bar of the moveable barrier to displace moveable barrier upwards as the platform is hoisted up into the first stop position. Further, the moveable barrier is lowered to or near to the level/height of the first lift stop position as the platform comprising the lift frame is lowered towards the second lift stop position. Further, a resting structure may be arranged at the base of the moveable barrier being for example an elongation/extension of the above-mentioned horizontal bar, extending in the opposite direction, which can rest on the rail system of the framework structure thereby prohibiting the moveable barrier from moving below the height/level of the rail system. When the resting structure of the barrier rests on the rail system, the barrier prohibits operating container handling vehicles on the rail system from entering into the first lift stop position.

In a second aspect the invention concerns a method of operating the automated storage and retrieval system discussed above. The method comprises the steps of moving the container handling vehicle from the rail system onto the platform which is positioned in the first lift position and then moving the platform into the second lift stop position enabling access for human operator(s) and/or robot(s) to perform in-situ maintenance on the container handling vehicle(s).

If the system comprises the above-mentioned locking mechanism, the method may further comprise the initial step of locking the platform into vertical alignment with the rail system when arranged at the first lift stop position.

The term "vertically offset" should be understood as having a distance in the vertical direction Z.

The term "accessing area" should be understood as an area which includes at least the second lift stop position and the area of the position of the human operator and/or robot conducting service/maintenance to the container handling vehicle.

Even if the disclosed vehicle elevator is said to be arranged to carry/support one or more container handling vehicles, it should be understood that the present invention is also suitable to carry one or more service vehicle(s) intended to service a malfunctioning container handling vehicle and/or to transport a malfunctioning container handling vehicle. Hence, the vehicle elevator may be suitable for carrying a manned or unmanned service vehicle to perform in-situ service on a malfunctioning container handling vehicle and/or for carrying a manned or unmanned service vehicle which can pick up and carry a malfunctioning container handling vehicle.

BRIEF DESCRIPTION OF THE DRAWINGS

The following drawings are appended to facilitate the understanding of the invention. The drawings show embodiments of the invention, which will now be described by way of example only, where:

FIG. 9A-C are close-up perspective views of a moveable barrier of the invention.

DETAILED DESCRIPTION OF THE INVENTION

Figure 1:
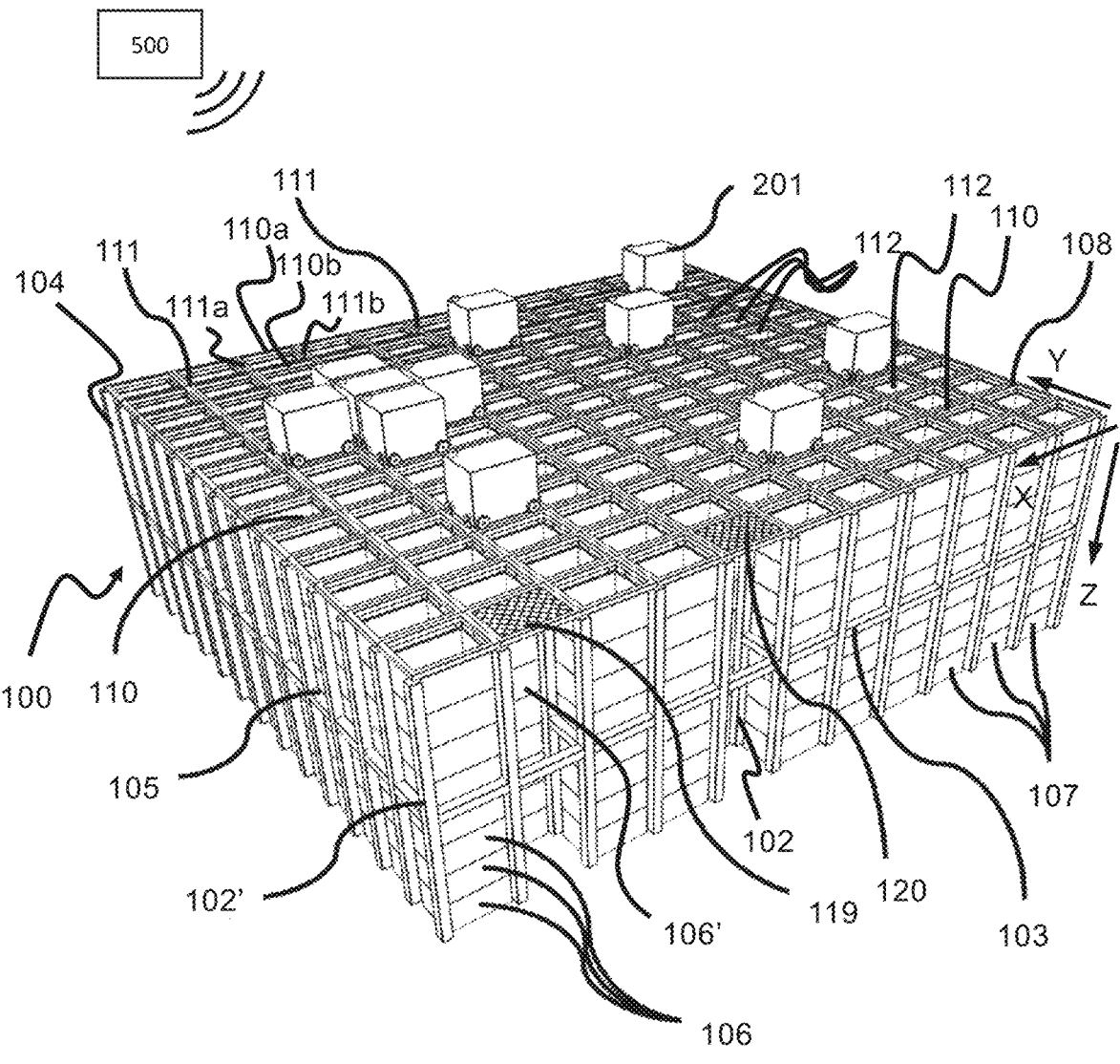
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
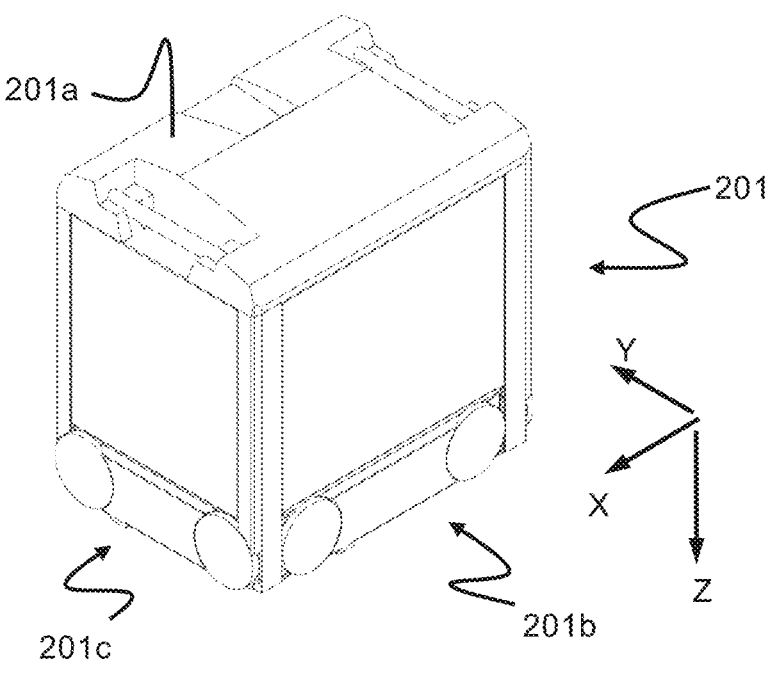
FIG. 2 is a perspective view of a prior art container handling vehicle having a centrally arranged cavity for carrying storage containers therein.
Figure 3:
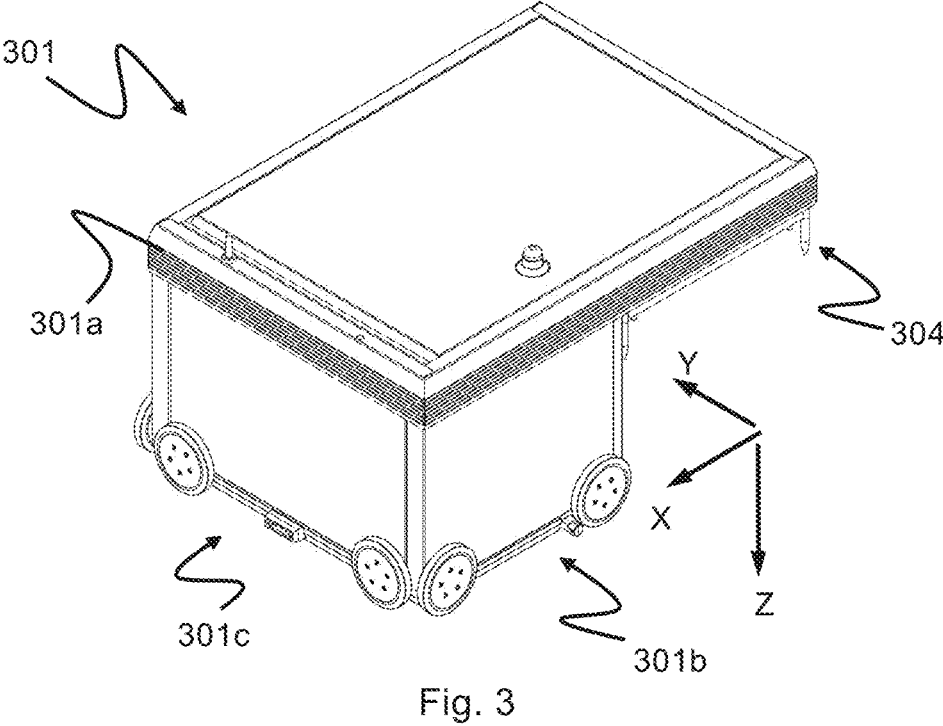
FIG. 3 is a perspective view of a prior art container handling vehicle having a cantilever for carrying storage containers underneath.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, where the framework structure 100 further comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure 100 can be considerably smaller than the framework structure disclosed in FIG. 1. Hence, the framework structure 100 can be narrower and/or shorter and/or less deep than disclosed in FIG. 1. For example, the framework structure 100 may have a horizontal extent of more than 4×8 columns and a storage depth of at least 5 containers.

One embodiment of the automated storage and retrieval system according to the invention will now be discussed in more detail with reference to FIGS. 4 to 11.

Figure 4:
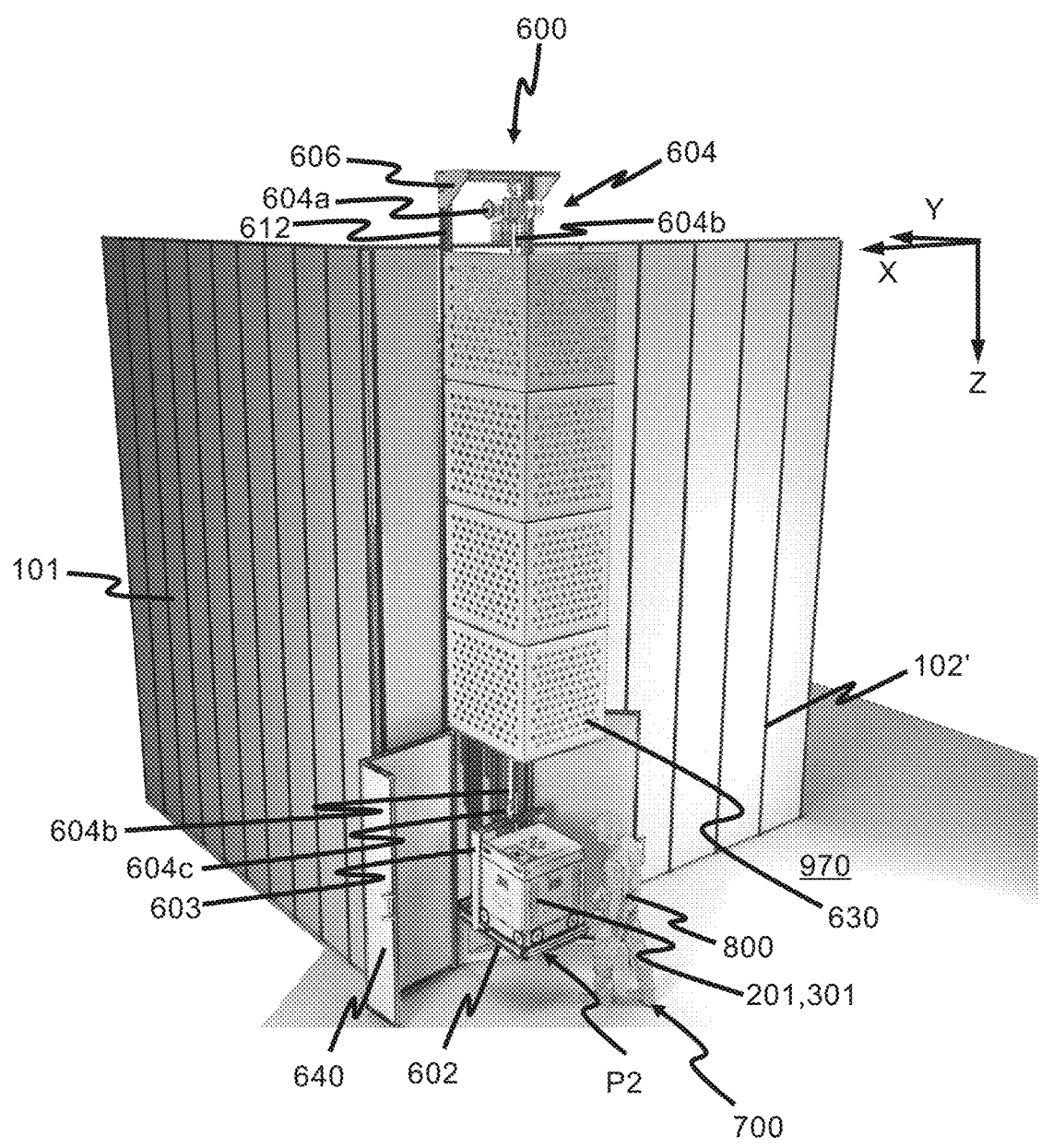
FIG. 4 is a perspective view of an example embodiment of an automated storage and retrieval system according to the present invention.
Figure 5:
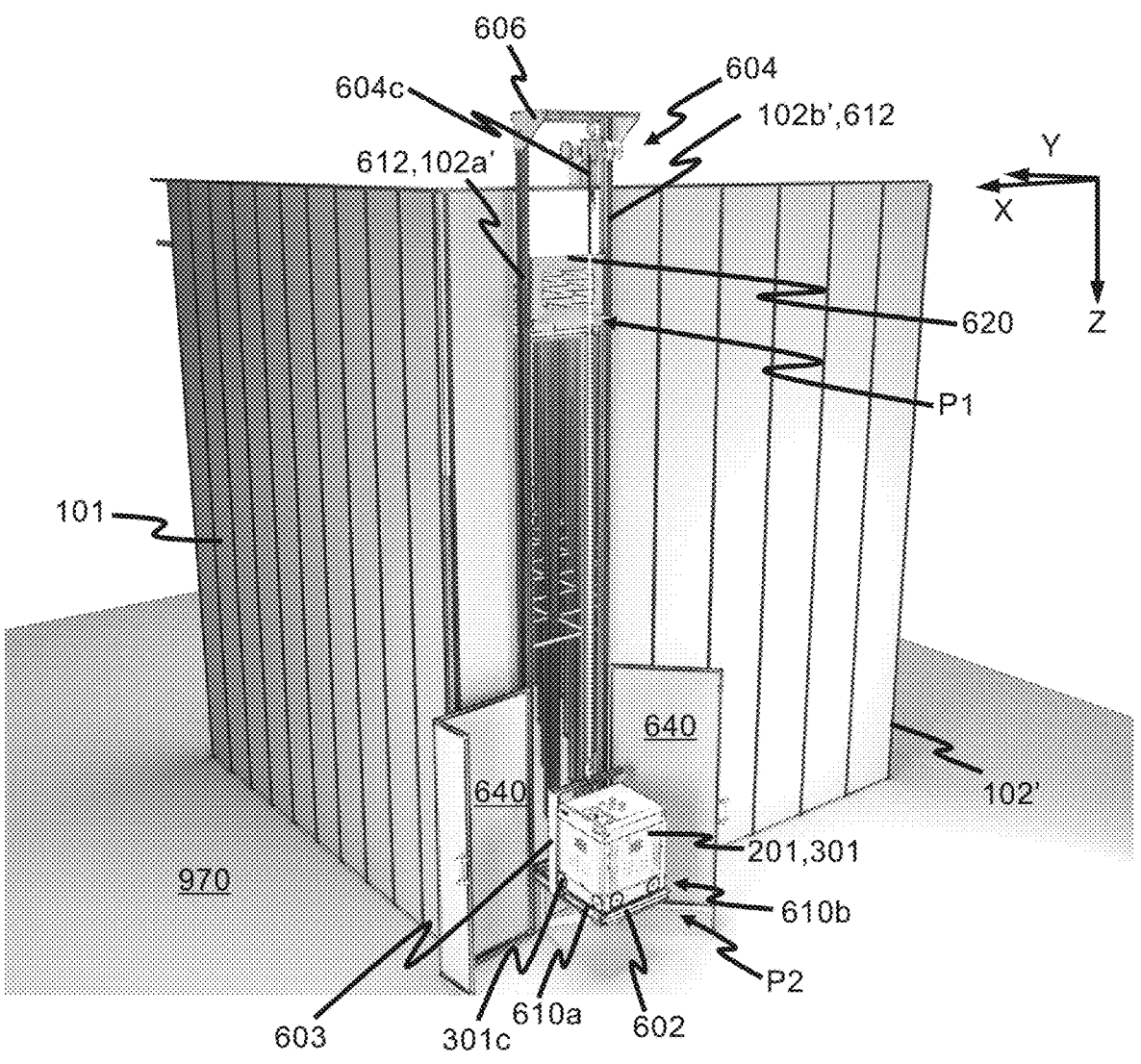
FIG. 5 is the same perspective view as shown in FIG. 4, having an open view of the vehicle elevator.
Figure 6:
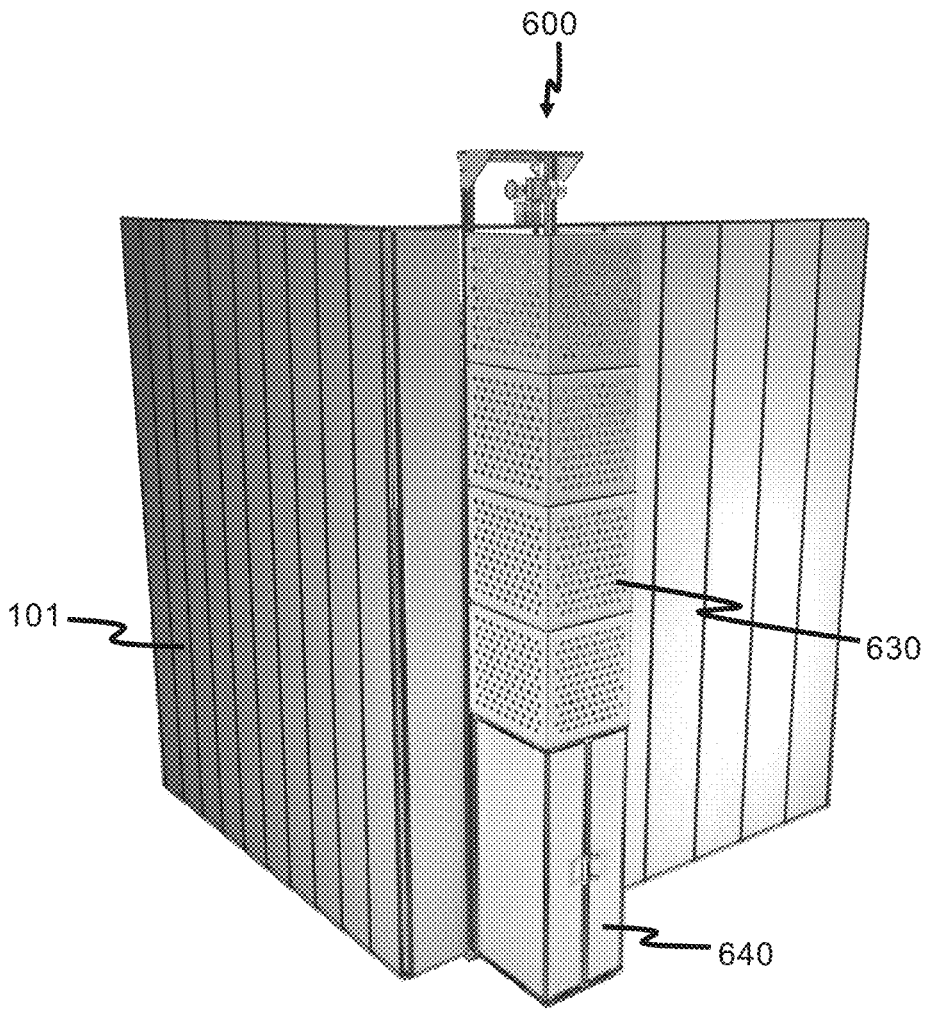
FIG. 6 is the same perspective view as shown in FIG. 4 wherein the shield is closed.

FIG. 4 to 6 show the horizontal periphery 101 of the framework structure of an automated storage and retrieval system, such as the one shown in FIG. 1 and the plurality of peripheral upright members 102' of the framework structure defining the horizontal periphery 101. Further, a vehicle elevator 600 is shown for transporting a container handling vehicle 201,301. The vehicle elevator 600 projects from the outer periphery 101 of the framework structure and spans between the first and second lift stop positions P1,P2.

The vehicle elevator 600 has a lift mechanism 604 and a platform 602 for transporting the container handling vehicle 201,301 in the vertical direction Z.

The lift mechanism has a winch 604*a* and a wire 604*b* which can be rolled up/spooled onto the winch 604*a*. A hook 604*c* is arranged at the one end of the wire 604*b* which is attached to the lift frame 603 of the platform 602 carrying the container handling vehicle 201,301. The platform 602 is lifted by spooling the wire 604*b* onto the winch 604*a*.

In FIGS. 4 and 5 the platform 602 comprising the container handling vehicle 201,301 is arranged at the second lift stop position P2 within the accessing area 700 and the container handling vehicle 201,301 is accessed by a human operator 800 who can conduct in-situ service on the container handling vehicle 201,301.

The shield shown as doors 640 are open while the platform 602 is arranged at the second lift stop position P2. The doors 640 are hinged to the vertically extending support 612 of vehicle elevator 600. The vertically extending support 612 is shown as guiding rails/peripheral vertical members, see FIG. 5.

The doors 640 provide a shield when closed protecting the human operator 800 from entering the second lift stop position P2 of the vehicle elevator 600. The doors 640 are closed during operation of the vehicle elevator, see FIG. 6, whilst when the doors 640 are open as shown in FIG. 4, they allow full and easy access to a human operator 800 to three sides of the container handling vehicle 201,301 when the platform 602, comprising the container handling vehicle 201,301, is arranged at the second lift stop position P2. The easy access allows the human operator 800 to conduct service or maintenance to the container handling vehicle 201,301 while the container handling vehicle 201,301 is arranged on the platform 602 at the second lift stop position P2.

The doors may be manually or automatically operated.

FIG. 4 further shows the shaft 630 arranged to prevent the container handling vehicle 201, 301 from falling off the platform 602 while the platform 602 is arranged at the first lift stop position and while the platform is lowered down to the second lift stop position. The doors 640 can be seen as an extension of the shield 630 when closed.

The platform 602 is shown moving in the vertical direction Z being perpendicular the horizontal directions X,Y.

FIG. 5 which illustrate the same system as FIG. 4 does not show the shaft for illustrative purposes.

It is shown in FIG. 5 that the vertically extending support 612 comprises two peripheral upright members 102*a'*,102*b'* of the plurality of peripheral upright members 102'. The two peripheral upright members 102*a'*,201*b'* serve as guiding rails for the platform 602 and for the moveable barrier 620. The moveable barrier 620 is arranged to hinder container handling vehicles operating on the rail system of the framework structure from moving into the first lift stop position P1 when the platform 602 is arranged away from the first lift stop position P1. The moveable barrier 620 is leaning on to a resting structure, see FIG. 9A, prohibiting the moveable barrier 620 from moving down towards the second lift stop position P2. The operation of the moveable barrier is discussed in detail with regard to FIGS. 9A-9C.

As shown, the two peripheral upright members 102*a'*, 102*b'* extend above the first lift stop position P1. As also seen in FIG. 4, an attachment bracket 606 is arranged at the upper end of the two peripheral upright members 102*a'*, 102*b'* for fixing the lift mechanism 604 thereto. The lift mechanism 604 is arranged such that the wire 604*b* is running in a substantially vertical direction Z when moving the platform 602.

The shield/doors 640 is shown in the open position allowing a human operator and/or robot to access the container handling vehicle 201,301 since the platform 602 is arranged in the second lift stop position P2.

The platform 602 comprises a set of parallel rails 610*a*, 610*b* which a set of driving means/wheels of container handling vehicle 201,301 are arranged on.

FIG. 6 shows the same system as FIG. 4 where the doors 640 are in a closed position thereby prohibiting a human operator from accessing the second lift stop position. The figure further illustrates how the doors 640 provide an extension of the shield 630 such that the container handling vehicle arranged on the platform of the vehicle elevator is protected by the shield or the door during operation.

Further, for security reasons for the human operator, the system should be operated such that the doors 640 are closed during operation of the vehicle elevator and while the platform of the vehicle elevator is arranged away from the second lift stop position, such as for example being arranged at the first lift stop position.

Further, the system should be operated such that the doors 640 can only be opened while the moveable barrier 620 is in a position where it hinders container handling vehicles operating on the rail system of the framework structure from entering the first lift stop position as shown in FIG. 5.

Figure 7:
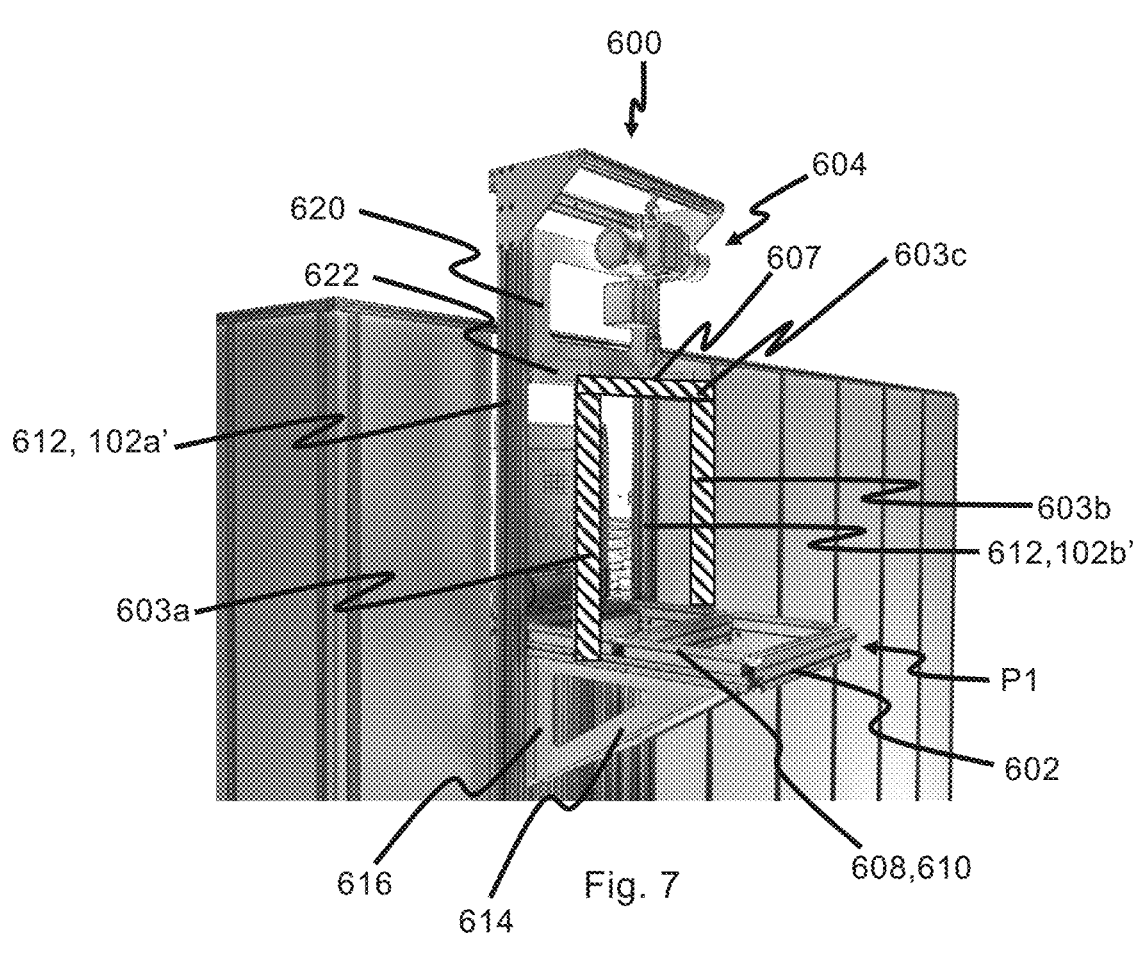
FIG. 7 is a close-up view of the first lift stop position shown in FIG. 5.

FIG. 7 is a close-up view of the platform 602 arranged at the first lift stop position P1. The platform 602 has a horizontal structure 608, a lift frame 603, a girder 614, a connection device 609 and a vertical structure 616.

The lift frame 603 comprising two poles 603*a,b* extending in the vertical direction from opposite sides of the platform 602. The two poles 603*a,b* are interconnected at their upper ends by a beam 603*c*. The upper ends of the two poles 603*a,b* are arranged distal the horizontally extending structure/horizontal structure 608 of the platform 602. The beam 603*c* of lift frame 603 may further comprise a suspension point 607 to be attached to the hook arranged on the wire of the lift mechanism 604.

The horizontal structure 608 of the platform supports the container handling vehicle (not shown) when arranged on the platform 602. The horizontal structure 608 shown comprises a rail arrangement 610 which is vertically aligned with the rail arrangement of the rail system of the framework structure such that the container handling vehicle can move from a position on the rail system of the framework to the first lift stop position of the platform 602 and vice versa. The moveable barrier 620 has two horizontally arranged bars resting on the beam 603*c* of the lift frame 603. Hence, when the platform 602 is arranged at the first lift stop position P1, the barrier 620 is arranged at above the lift frame 603 of the platform 602 allowing a container handling vehicle to enter onto the platform 602. The moveable barrier will be discussed further with regard to FIG. 9A-C.

The platform 602 is moveably connected to the vertically extending support 612 shown as two guiding rails 102*a'*, 102*b'* by linear rollers/wheels (not shown). At least one linear roller is moveably arranged on each guiding rail and fixedly arranged to two vertical structures 616 of the platform 602. Each vertical structure 616 forms a corner bracket structure with opposite sides of the horizontal structure 608. The sides of the horizontal structure 608 are extending in the moving direction of the container handling vehicle when moving in or out of the platform 602. The two vertical structures 616 are arranged below the horizontal structure 608, each vertical structure 616 supporting the side of the horizontal structure 608 and being moveably attached to the guiding rails.

Further, two diagonally arranged girders 614 are arranged for strengthening the connection between the horizontal structure 608 and each of the two vertical structures 616 providing further support when the container handling vehicle is arranged on the platform 602.

The horizontal structure 608 of the platform 602 has a rail arrangement 610 being equal to two grid cells of the rail system of the framework structure. When the platform 602 is arranged at the first lift stop position P1, the rail arrangement 610 on the platform 602 is vertically aligned with the rail system of the framework allowing a container handling vehicle to move to and from the platform 602.

Figure 8:
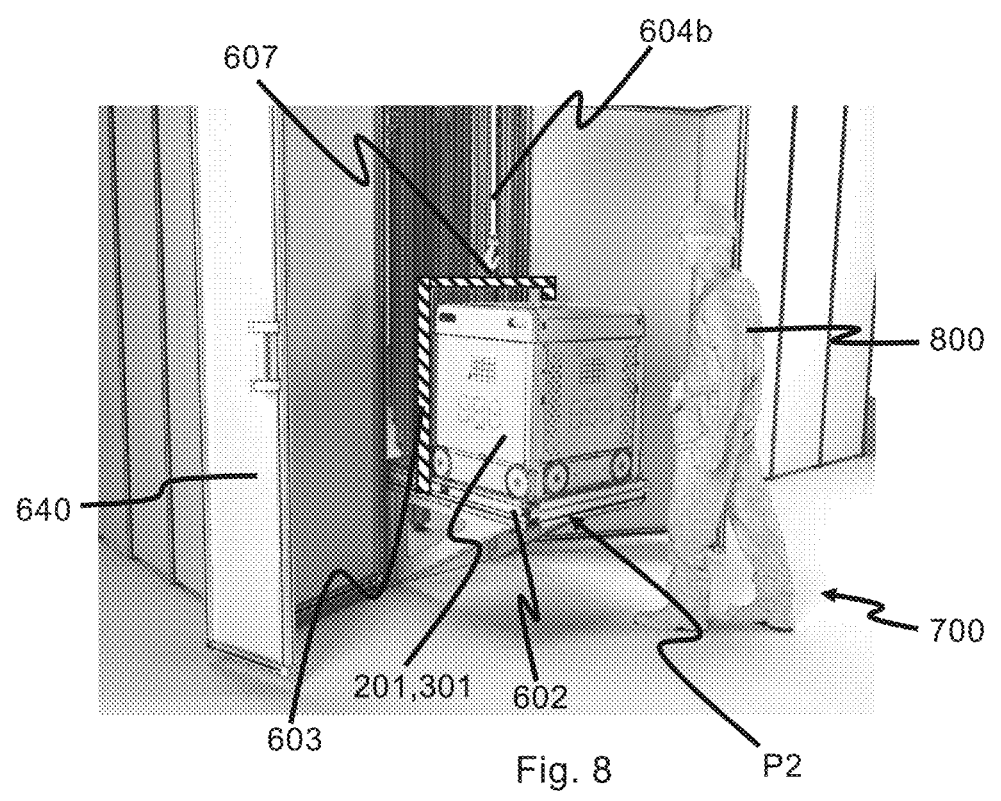
FIG. 8 is a close-up view the second lift stop position shown in FIG. 4.

FIG. 8 is a close-up view of the platform 602 arranged at the second lift stop position P2. The second lift stop position P2 is arranged within the accessing area 700. The platform 602 has a container handling vehicle 201,301 arranged thereon, and the shield shown as doors 640 are open for the access to the container handling vehicle 201,301 by the human operator 800.

As shown in FIG. 7, the lift frame 603 of the platform 602 is arranged to reach around opposed sides of the container handling vehicle 201,301. The lift frame 603 is connected to the wire 604*b* of the lift mechanism at the suspension point 607 of the lift frame 603.

FIG. 9A-C are detailed views of the operation of the moveable barrier 620 arranged to prevent operating container handling vehicles from entering the first lift stop position P1 when the platform 602 is arranged away from the first lift stop position P1.

In FIG. 9A the moveable barrier 620 is arranged such that it prohibits the container handling vehicles operating on the rail system 108 of the framework structure from moving into the first lift stop position P1. Two resting structures 622', in the form of bars, are fixed to the base of the barrier 620 and extending horizontally such that the resting structures 622' are resting on the rail system 108 of the framework structure. When the resting structures 622' of the barrier 620 are resting on the rail system 108, the container handling vehicles arranged on the rail system 108 are hindered from moving into the first lift stop position P1.

The moveable barrier 620 has connection devices in the form of linear rollers 623 being moveably arranged to the guiding rails 612,102*a'*,102*b'* such that the barrier 620 can be moved along the guiding rails 612,102*a'*,102*b'* in the vertical direction.

FIG. 9B shows an arrangement wherein the platform (not visible) of the vehicle elevator having a container handling vehicle 201,301 arranged thereon is approaching the first lift stop position P1 from the second lift stop position. As the platform approaches the first lift stop position, the moveable barrier 620 is lifted by the lift frame of the platform, see FIG. 7. Hence, the horizontal bar of the barrier 620 rests on the beam of the lift frame of the platform instead of resting structure 622' of the barrier 620 resting on the rail system 108 as shown in FIG. 9A.

In FIG. 9C the platform 602 of the vehicle elevator is arranged at the first lift stop position P1 as also shown in FIG. 7 from the opposite angle. The rail arrangement 610 of the platform 602 is vertically aligned with the rail system 108. Further, the barrier 620 has been lifted such that the container handling vehicle 201,301 arranged on the platform 602 can move onto the rail system 108.

Figure 10:
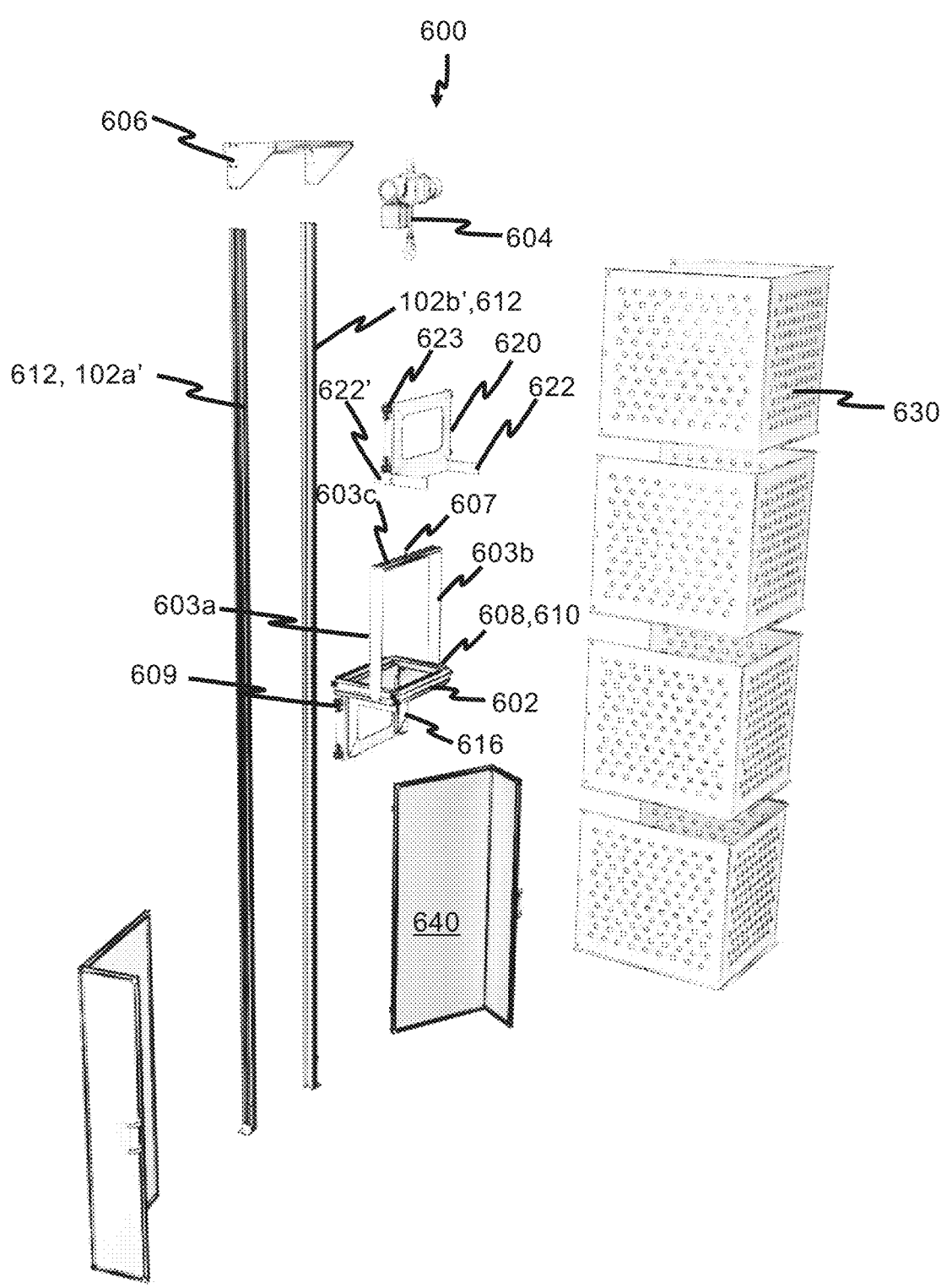
FIG. 10 is an illustrative view of the components of a vehicle elevator, shield and shaft according to the invention.

FIG. 10 is an illustration of the different parts of the vehicle elevator 600, the shaft 630 and the shield 640.

As shown, the vehicle elevator has a vertically extending support 612 shown as peripheral upright members 102*a'*, 102*b'* of the framework structure serving as guiding rails for the platform 602.

The attachment bracket 606 can be fixed to the vertically extending support 612 and is arranged for fixing the lift mechanism 604 thereto.

The moveable barrier 620 is shown having connection means 623 for moveable attaching the barrier 620 to the vertically extending support 612. Further, the horizontal bars

622 of the barrier 620 are illustrated which engages with the beam 603c of the lift frame 603 when the beam 603c of the lift frame 603 enters the first lift stop position. The resting structure 622' is also shown which allows the moveable barrier 620 to rest onto the rail system of framework structure while the platform 602 is arranged away from the first lift stop position.

As shown the platform 602 has a horizontal structure 608 fixed to a vertical structure 616, the two forming a corner bracket. The vertical structure 616 has connection devices 609 fixed thereto for moveably attaching the platform 602 to the guiding rails 102a',102b' of the vertical extending support 612. The horizontal structure 608 has a rail arrangement 610 having the size of one grid cell of the rail system of the framework structure.

Further, the lift frame 603 of the platform 602 is shown having two poles 603a,603b arranged at opposite sides of the horizontal structure 608 being interconnected at their upper ends by a beam 603c. The poles 603a,603b have a vertical extension that is longer than the height of the container handling vehicle to be carried on the platform 602 such that the lift frame 603 frames the container handling vehicle when arranged on the horizontal structure 608 of the platform 602.

FIG. 11 A-D discloses the operation of the locking mechanism 650 arranged to keep the rail arrangement 110 of the platform 602 at a set height in vertical alignment with the rail system 108 when the platform 602 is arranged at the first lift stop position P1.

The shown locking mechanism 650 has a bracket 651 connected to the platform 602 and a spring-biased pawl 652 having a spring 653 attached thereto connected to the vertically extending support 612 of the vehicle elevator. The bracket 651 has an upper and lower protrusion 651a,651b arranged at the upper and lower end of the bracket respectively. The upper and lower protrusions 651a,651b are both vertically and horizontally displaced. Further, the pawl 652 has a locking lip 652a at its upper end and a releasing lip 652b at its lower end.

The arrow in the drawings indicating the direction of the movement of the platform 602 and consequently the bracket 651.

Figure 11A:
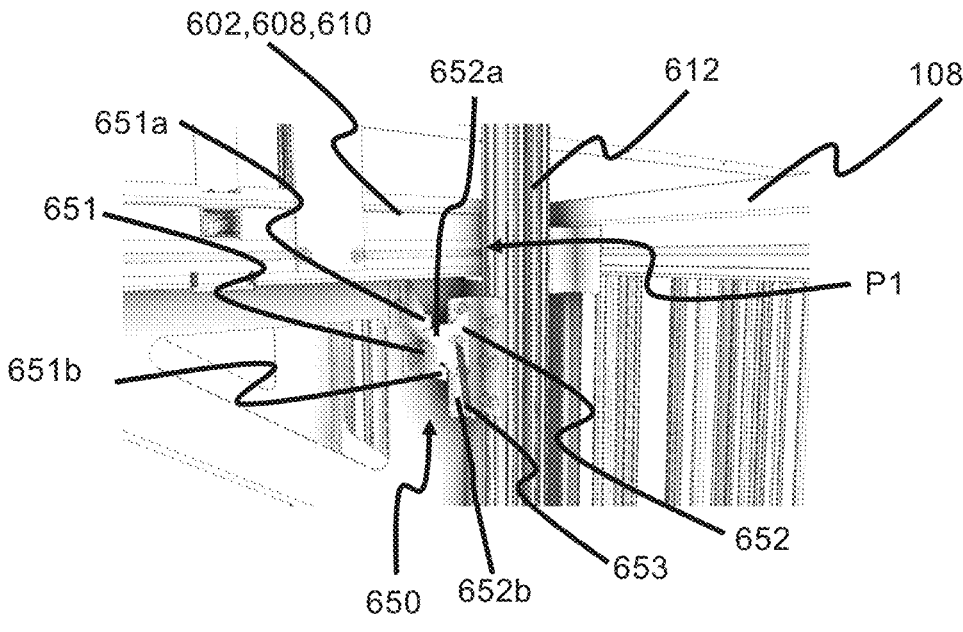
FIG. 11A-D are close-up views of a locking mechanism of the invention.
Figure 11B:
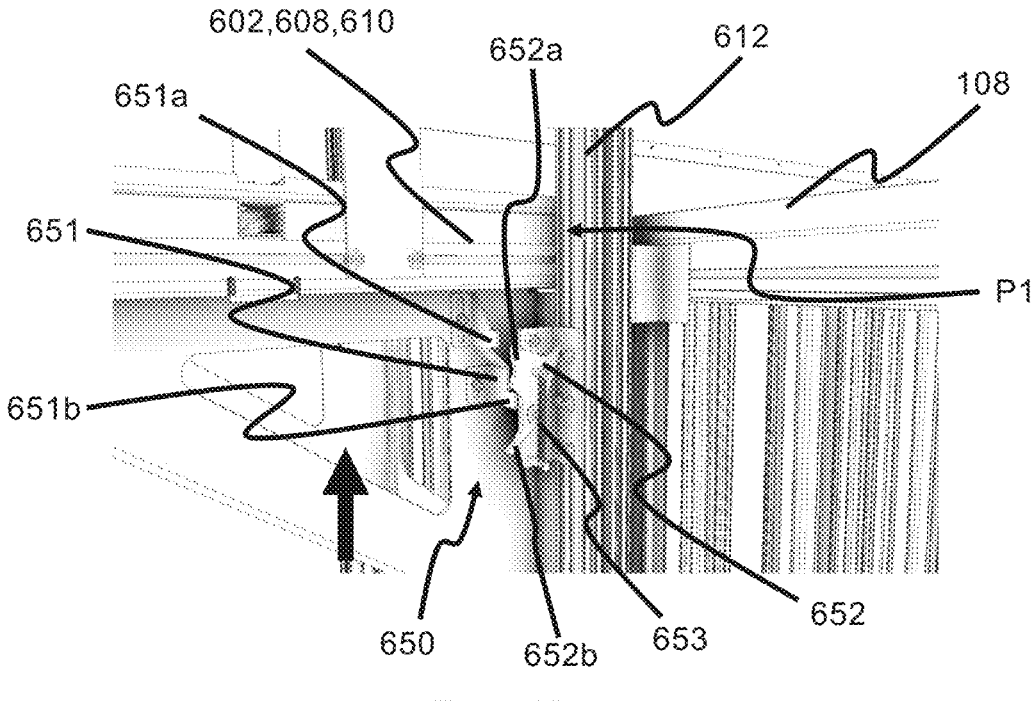

In FIG. 11A the pawl 652 is arranged in a biased/suspended locked position and the upper protrusion 651a of the bracket 651 is resting on the locking lip 652a of the biased pawl 652. The locking lip 652a is arranged between the upper and lower protrusion 651a,651b of the bracket 651. In this locked position the rail arrangement 610 of the horizontal structure 608 of the platform 602 is vertically aligned with the rail system 108 of the framework structure. FIG. 11B illustrates how the locking mechanism 650 unlocks by slightly lifting the platform 602 and consequently the bracket 651 such that the lower protrusion 651b at the lower end of the bracket 651 moves the locking lip 652a of the pawl 652 causing the pawl 652 to be swiveled into a release position such that the platform 602 thereafter can be lowered towards the second lift stop position.

Figure 11C:
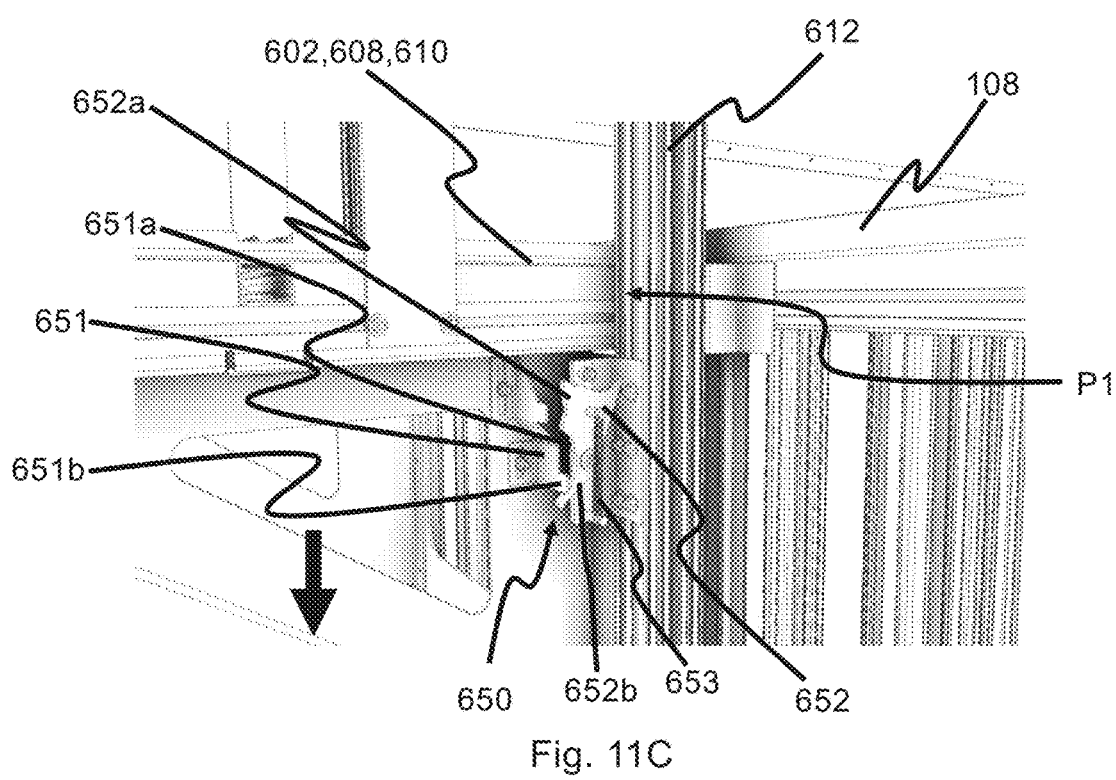

FIG. 11C illustrates how the pawl 652 is swiveled back into its biased position after the platform 602 has been further lowered as releasing lip 652b of the pawl 652 is pushed by the lower protrusion 651b of the bracket 651 during lowering of the platform 602. However, the biased position of the pawl 652 does not lock the pawl 652 to the bracket 651 as the upper protrusion 651a of the bracket 651 has been lowered below the locking lip 652a of the pawl 652. Hence, the platform 602 can freely move to the second lift stop position.

Figure 11D:
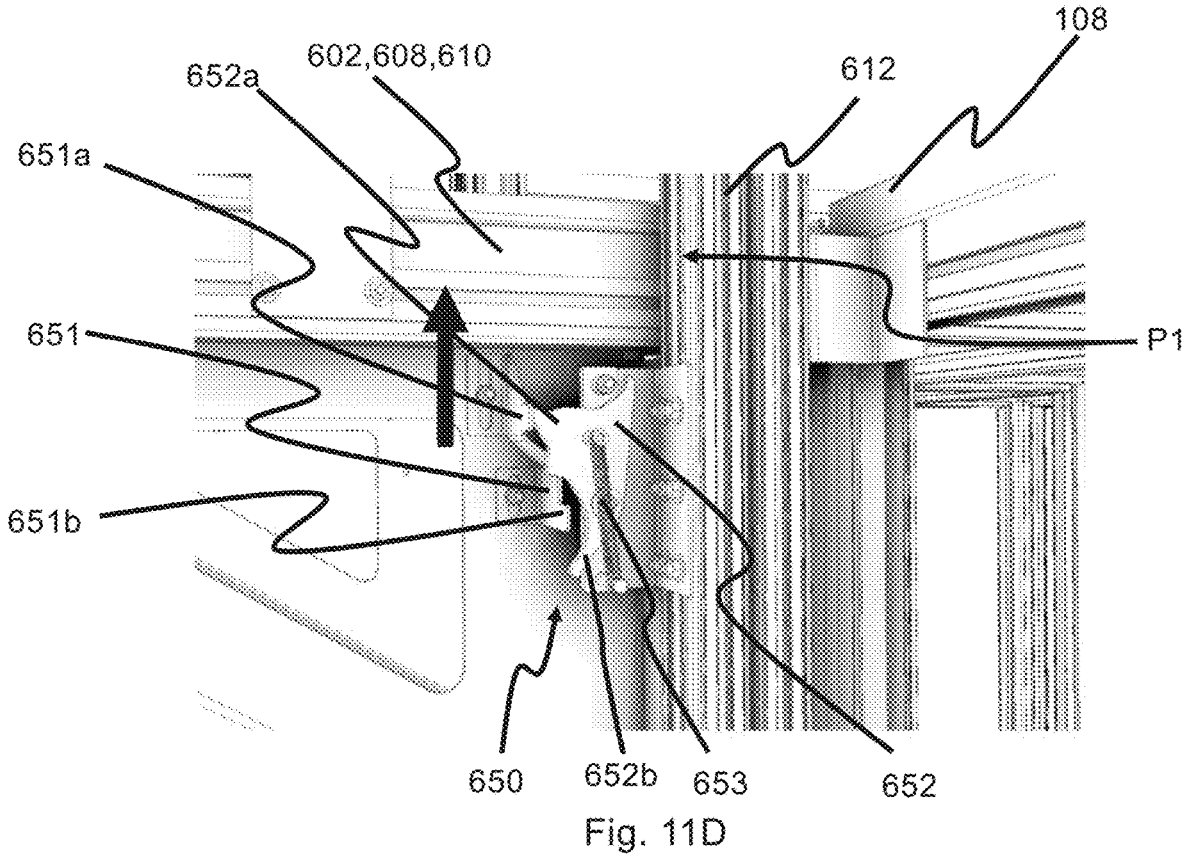

FIG. 11D shows the platform moving from the second lift stop position as the platform 602 approaches the first lift stop position P1. The upper protrusion 651a of the bracket 651 slightly pushes locking lip 652a of the pawl 652 as the bracket 651 passes the pawl 652 while the platform 602 moves to a position slightly above the first lift stop position P1. After the upper protrusion 651a of the bracket 651 has passed the locking lip 652a of the pawl 652, the pawl 652 is swiveled back to the locked biased position. Thereafter the platform 602 with the bracket 651 is then slightly lowered into a resting position such that the upper protrusion 651a of the bracket 651 rests on the locking lip 652a of the fully biased pawl 652 when in the locked position as shown in FIG. 11A.

Figure 12:
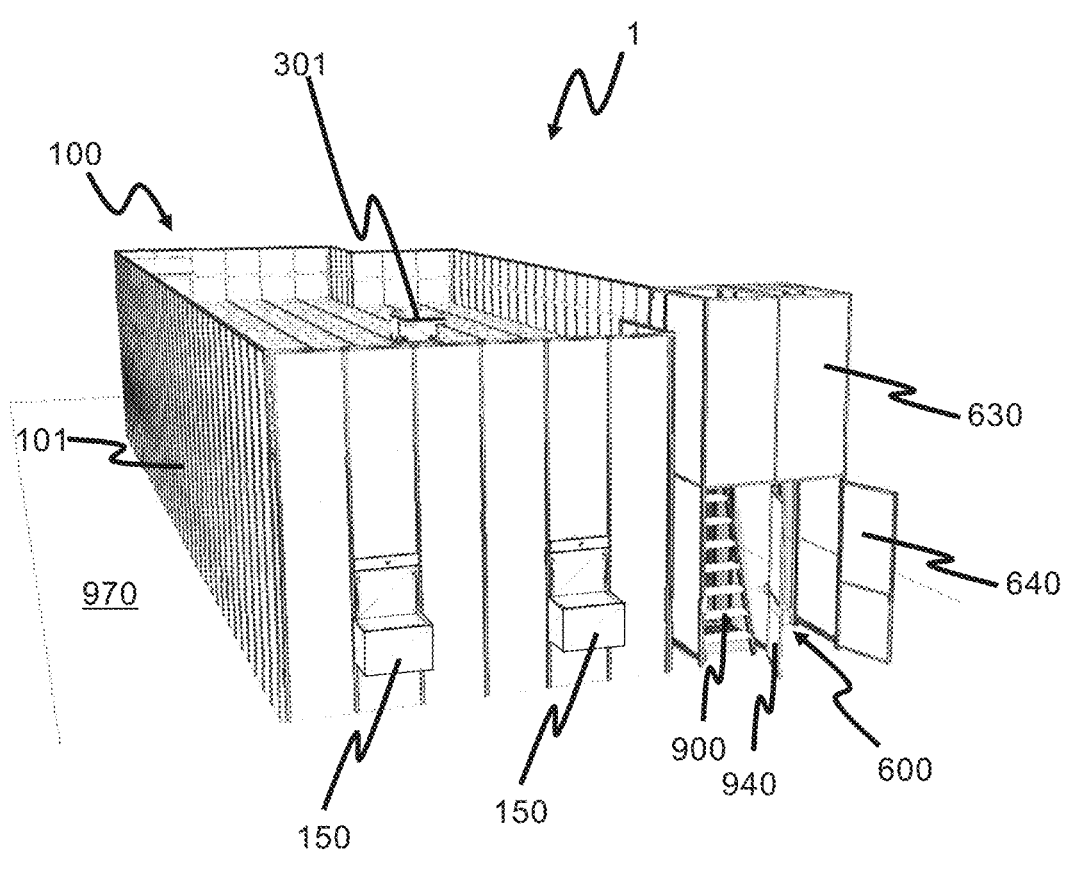
FIG. 12 is a perspective view of an example embodiment of an automated storage and retrieval system according to the present invention.
Figure 13:
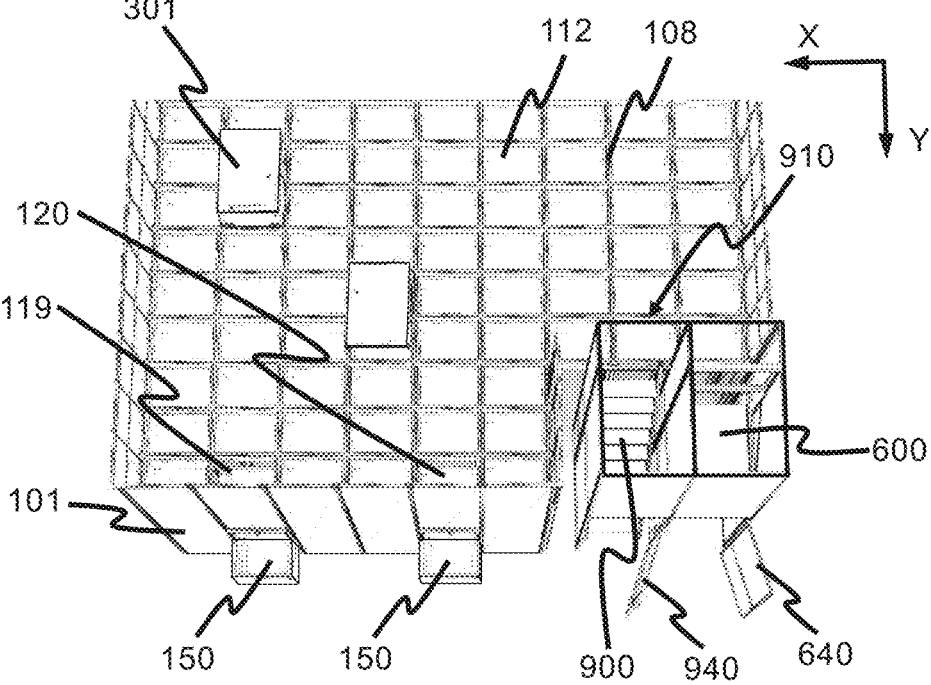
FIG. 13 is perspective view of an example embodiment of an automated storage and retrieval system according to the present invention

FIGS. 12 and 13 both illustrate an automated storage and retrieval system 1 from different angles. The system 1 has a framework structure 100 wherein container handling vehicles 301 operate on the rail system 108 thereof.

On the periphery of the framework structure 100 two access stations 150 are arranged for accessing the storage containers from the outside of the framework structure 100. The one access station 150 is arranged in connection with the first port column 119 and the other access station 150 is arranged in connection with the second port column 120 operating as disclosed with regard to FIG. 1.

Further, the system 1 has a vehicle elevator 600 as shown in FIGS. 4 to 6 arranged at the periphery of the framework structure 100. Adjacent the vehicle elevator 600 is a staircase 900 for a human operator to access the rail system 108 from the floor level 970.

As shown, the staircase 900 spans from the floor level 970 of the system 1 to the level of the rail system 108 of the framework structure 100 of the system 1.

For protecting the human operator from accessing the rail system 108 during operation of the system 1, the staircase 900 is arranged behind a door 940 which can be controlled manually or automatically such that the door 940 only can be opened when the system 1 is shut down.

The rail system 108 and/or the staircase 900 at the level of the rail system 108 may, even if not shown, comprise a barrier preventing operating container handling vehicles 301 from entering the staircase 900. However, such barrier may not be needed as the staircase in FIGS. 12 and 13 are arranged such that the position of the rails of the rail system 108 prohibits the container handling vehicles 301 from entering the staircase 900.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

| 1 | Automated storage and retrieval system |
|---|---|
| 100 | Framework structure |
| 101 | Horizontal periphery of the framework structure |
| 102 | Internal upright members of framework structure |
| 102' | Peripheral upright members of framework structure |
| 102a', 102b' | Peripheral upright member serving as guiding rail |
| 103 | Horizontal members of framework structure |
| 104 | Storage grid |
| 105 | Storage column |
| 106 | Storage container |
| 106' | Particular position of storage container |
| 107 | Stack |
| 108 | Rail system |
| 110 | Parallel rails in first direction (X) |
| 110a | First rail in first direction (X) |
| 110b | Second rail in first direction (X) |
| 111 | Parallel rail in second direction (Y) |
| 111a | First rail of second direction (Y) |
| 111b | Second rail of second direction (Y) |
| 112 | Access opening |
| 119 | First port column |
| 120 | Second port column |
| 150 | Access station |
| 201 | Prior art storage container vehicle |
| 201a | Vehicle body of the storage container vehicle 201 |
| 201b | Drive means/wheel arrangement, first direction (X) |
| 201c | Drive means/wheel arrangement, second direction (Y) |
| 301 | Prior art cantilever storage container vehicle |
| 301a | Vehicle body of the storage container vehicle 301 |
| 301b | Drive means in first direction (X) |
| 301c | Drive means in second direction (Y) |
| 304 | Gripping device |
| 500 | Control system |
| 600 | Vehicle elevator |
| 602 | Platform |
| 603 | Lift frame |
| 603a, b | Poles of lift frame |
| 603c | Beam of lift frame |
| 604 | Lift mechanism |
| 604a | Winch |
| 604b | Wire |
| 604c | Hook |
| 606 | Attachment bracket |
| 607 | Suspension point of lift frame |
| 608 | Horizontal structure/horizontally extending structure |
| 609 | Connection device of platform |
| 610 | Platform rail arrangement |
| 610a | Rail of platform rail arrangement |
| 610b | Rail of platform rail arrangement |
| 612 | Vertical extending support |
| 614 | Girder |
| 616 | Vertically extending structure/vertical structure |
| 620 | Moveable barrier/barrier |
| 622 | Horizontal bar of moveable barrier |
| 622' | Resting structure of moveable barrier |
| 623 | Linear bearings of moveable barrier |
| 630 | Shaft |
| 640 | Shield/door |
| 650 | Locking mechanism |
| 651 | Bracket |
| 651a | Upper protrusion of bracket |
| 651b | Lower protrusion of bracket |
| 652 | Pawl |
| 652a | Locking lip of the pawl |
| 652b | Releasing lip of the pawl |
| 653 | Spring |
| 700 | Accessing area |
| 800 | Human operator/personnel |
| 900 | Stairs/ladder |
| 910 | Opening |
| 940 | Shield/door |
| 970 | Floor level |
| P1 | First lift stop position |
| P2 | Second lift stop position |
| X | First direction |

-continued

| Y | Second direction |
|---|---|
| Z | Third direction, vertical direction |

The invention claimed is:

1. An automated storage and retrieval system comprising:
a framework structure having a plurality of internal and peripheral upright members arranged to define a storage grid comprising multiple storage columns for storing storage containers on top of each other in vertical stacks,
at least one container handling vehicle,
wherein the upright members of the framework structure are interconnected at their upper ends by a rail system arranged to guide at least one container handling vehicle thereon, the container handling vehicle being configured to raise storage containers from, and lower storage containers into the storage columns and to transport the storage containers horizontally above the storage columns, wherein the peripheral upright members of the framework structure define a horizontal periphery of the framework structure, and
a vehicle elevator comprising:
a vertically extending support,
a platform comprising:
a horizontally extending structure arranged to carry the container handling vehicle, and
a connection device moveably attaching the platform to the vertically extending support, and
a lift mechanism arranged to move the platform between a first lift stop position, which establishes access between the platform and the rail system, and a second lift stop position arranged within an accessing area such that a human operator/service personnel and/or robot can perform in-situ maintenance on the container handling vehicle while the container handling vehicle is arranged on the platform, and wherein the first and second lift stop positions are arranged vertically offset, and
wherein the accessing area includes at least the second lift stop position and the area of the position of the human operator/service personnel and/or robot for enabling access to the container handling vehicle for the human operator/service personnel and/or robot to perform in-situ maintenance to the container handling vehicle.

2. The system according to claim 1, wherein the lift mechanism comprises a winch and a cable for lifting the platform.

3. The system according to claim 1, wherein the horizontally extending structure of the platform comprises a platform rail arrangement comprising:
at least one set of parallel rails configured to allow the container handling vehicle to move between the platform rail arrangement and the rail system when the platform rail arrangement is vertically level with the rail system and the platform is in the first lift stop position.

4. The system according to claim 1, wherein the system comprises a moveable barrier configured to prohibit the container handling vehicle from entering into the first lift stop position when the platform is positioned away from the first lift stop position, and to allow the container handling vehicle to enter the platform when the platform is arranged at the first lift stop position.

5. The system according to claim 1, wherein the platform of the vehicle elevator comprises a lift frame which is arranged to reach around opposed sides of a container handling vehicle when it is being carried on the platform, and wherein the lift frame is connected to the lift mechanism in order to lift the platform.

6. The system according to claim 1, wherein the vehicle elevator projects from an outer periphery of the storage grid of the framework structure.

7. The system according to claim 6, wherein the vertically extending support comprises at least two of the plurality of peripheral upright members serving as guiding rails for guiding the platform of the vehicle elevator in a vertical direction between the first and second lift stop positions.

8. The system according to claim 4,
wherein the platform of the vehicle elevator comprises a lift frame which is arranged to reach around opposed sides of a container handling vehicle when it is being carried on the platform, and wherein the lift frame is connected to the lift mechanism in order to lift the platform
wherein the vehicle elevator projects from an outer periphery of the storage grid of the framework structure, and
wherein the lift frame is configured to engage and lift the moveable barrier such that the moveable barrier allows the container handling vehicle to enter the platform when the platform is arranged at the first lift stop position.

9. The system according to claim 1, wherein the platform is arranged within a shaft when moved between the first and second lift stop positions, the shaft being configured to prevent the container handling vehicle from falling off the platform.

10. The system according to claim 1, wherein a shield is arranged to block access to the second lift stop position when the shield is closed, the shield only being openable once the platform has reached the second lift position.

11. The system according to claim 1, comprising a locking mechanism provided on the framework structure and arranged to lock the platform at a set height in vertical alignment with the rail system when arranged at the first lift stop position.

12. The system according to claim 11, wherein the locking mechanism comprises a bracket positioned on the platform and arranged to lock and unlock to a biased pawl arranged on the horizontal periphery of the framework structure.

13. A method of operating an automated storage and retrieval system comprising:
a framework structure having a plurality of internal and peripheral upright members arranged to define a storage grid comprising multiple storage columns for storing storage containers on top of each other in vertical stacks,
at least one container handling vehicle,
wherein the upright members of the framework structure are interconnected at their upper ends by a rail system arranged to guide at least one container handling vehicle thereon, the container handling vehicle being configured to raise storage containers from, and lower storage containers into, the storage columns, and to transport the storage containers horizontally above the storage columns, wherein the peripheral upright members of the framework structure define an horizontal periphery of the framework structure, and
a vehicle elevator comprising:
a vertically extending support,
a platform comprising a horizontally extending structure arranged to carry the container handling vehicle and a connection device moveably attaching the platform to the vertically extending support, and
a lift mechanism arranged to move the platform between a first lift stop position, which establishes access between the platform and the rail system, and a second lift stop position which is arranged within an accessing area such that a human operator/service personnel and/or robot can perform in-situ maintenance on the container handling vehicle while the container handling vehicle is arranged on the platform, and wherein the first and second lift stop positions are arranged vertically offset, and
wherein the method comprises:
i) moving the container handling vehicle from the rail system onto the platform which is positioned in the first lift position,
ii) moving the platform into the second lift stop position, enabling access to the container handling vehicle for a human operator and/or robot to perform in-situ maintenance on the container handling vehicle.

14. The method in accordance with claim 13, wherein the system further comprises a locking mechanism provided on the framework structure, and wherein the method comprises an initial step of locking the platform into vertical alignment with the rail system when arranged at the first lift stop position.

15. The method in accordance with claim 13,
wherein the accessing area includes at least the second lift stop position and the area of the position of the human operator/service personnel and/or robot for enabling access to the container handling vehicle for the human operator and/or robot to perform in-situ maintenance on the container handling vehicle.

* * * * *